US010051579B2

(12) United States Patent
Joung et al.

(10) Patent No.: US 10,051,579 B2
(45) Date of Patent: Aug. 14, 2018

(54) CHANNEL SIMULATOR USING PATH LOSS OF TERMINAL TRANSMIT POWER TO ESTABLISH ATTENUATION AMOUNT IN UPLINK SIGNAL TO BASE STATION

(71) Applicant: INNOWIRELESS CO., LTD., Seongnam-si, Gyeonggi-do (KR)

(72) Inventors: Jin Soup Joung, Seongnam-si (KR); Joo Hyeong Lee, Seoul (KR); Yong Hoon Lim, Seoul (KR); Kyoung Hwan Ju, Suwon-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 0 days.

(21) Appl. No.: 15/391,282

(22) Filed: Dec. 27, 2016

(65) Prior Publication Data
US 2017/0188313 A1  Jun. 29, 2017

(30) Foreign Application Priority Data
Dec. 28, 2015 (KR) .......................... 10-2015-0187820

(51) Int. Cl.
*H04W 24/06* (2009.01)
*H04B 17/391* (2015.01)
(Continued)

(52) U.S. Cl.
CPC ...... *H04W 52/242* (2013.01); *H04B 17/3912* (2015.01); *H04W 24/06* (2013.01);
(Continued)

(58) Field of Classification Search
CPC ...... H04B 17/00; H04B 17/30; H04B 17/209; H04B 17/391; H04B 17/3911;
(Continued)

(56) References Cited

U.S. PATENT DOCUMENTS 6,021,333 A * 2/2000 Anderson ............. G10L 19/012
455/517
2008/0151763 A1* 6/2008 Lee ......................... H04L 43/50
370/241

FOREIGN PATENT DOCUMENTS

| JP | 09-065432 A | 3/1997 |
| KR | 10-1286023 B1 | 7/2013 |
| KR | 10-1523103 B1 | 5/2014 |

* cited by examiner

*Primary Examiner* — Philip Sobutka
(74) *Attorney, Agent, or Firm* — Novick, Kim & Lee, PLLC; Jae Youn Kim (57) ABSTRACT

Provided is a control method for a channel simulator, capable of expanding a processable dynamic range of an uplink signal receiving unit while adopting an A/D converter (ADC) having low resolution by adjusting an attenuation amount of the uplink signal receiving unit in a large-capacity channel simulator having P base stations and Q terminal interfaces. In a control method for a channel simulator that includes P base station interface cards (BS I/F cards) (P>2; P is an integer), a link processor block, and Q user equipment interface cards (UE I/F cards) (Q>2; Q is an integer) to form channels with respect to all paths between P base stations and Q terminals, the control method for the channel simulator according to the present invention includes: (a) establishing a table representing an attenuation amount offset in an uplink signal receiving unit of the UE I/F card over a path loss based on log data with respect to terminal transmission power over the path loss for eliminating change of the path loss exerting an influence upon the terminal transmission power; (b) searching for a specified path loss value from the table established in step (a) to determine an attenuation amount corresponding to the specified path loss value when a path loss value with respect to an uplink signal processing process is specified; and (c) adjusting an attenu-
(Continued)

ation amount in the uplink signal receiving unit of the UE I/F card based on the attenuation amount determined in step (b).

4 Claims, 6 Drawing Sheets

(51) Int. Cl.
   *H04W 52/24* (2009.01)
   *H04W 52/14* (2009.01)
   *H04W 52/52* (2009.01)

(52) U.S. Cl.
   CPC ......... *H04W 52/146* (2013.01); *H04W 52/52* (2013.01); *H04B 17/3911* (2015.01)

(58) Field of Classification Search
   CPC ....................... H04B 17/3912; H04B 17/3913; H04B 24/00; H04B 24/06; H04B 52/242; H04B 52/24; H04B 52/06; H04B 52/08
   USPC ...... 455/522, 69, 67.11, 63.1, 423, 424, 446
   See application file for complete search history.

CHANNEL SIMULATOR USING PATH LOSS OF TERMINAL TRANSMIT POWER TO ESTABLISH ATTENUATION AMOUNT IN UPLINK SIGNAL TO BASE STATION

BACKGROUND OF THE INVENTION

1. Field of the Invention

The present invention relates to a control method for a channel simulator, capable of expanding a processable dynamic range of an uplink signal receiving unit while adopting an A/D converter (ADC) having low resolution by adjusting an attenuation amount of the uplink signal receiving unit in a large-capacity channel simulator having P base stations and Q terminal interfaces.

2. Description of the Related Art

Recently, researches on multimedia communication systems for simultaneously accommodating high-quality high-speed voice and data have been actively conducted as information society is accelerated. Meanwhile, mobile communication users have endlessly required higher-level communication quality, lower error rates, higher data rates, and so on, but designing a system required for a mobile communication channel is significantly difficult.

In multi-path communication channels, line-of-sight components, reflective components, diffracted wave components, and the like exist between a base station (BS), serving as a transmitter, and a mobile station (MS) or user equipment (UE), serving as a receiver, to exert influences upon each other. The signals are received to a terminal through multi-paths and a Doppler spread occurs as the terminal is moved, thus a propagation environment becomes inferior to that of stationary communication.

In general, rural or suburban environments having the line-of-sight signals may be explained using a Rician channel model, and composite signals caused by the multi-paths, in which the line-of-sight components sparsely exist, represent Rayleigh distribution. In addition, the shading effect is appeared due to irregular surrounding topographies.

Since the wireless channels have significantly various propagation environments, the original performance of the wireless system must be represented even under different propagation environments. In order to ensure the performance of the wireless system, proto typing and a field test as well as the verification based on simulation and analysis are significantly important to every service providers. However, the field test for a developed wireless system under all environmental conditions requires too much time and costs. The more practical way to perform the field test is to use a real-time channel simulator. The real-time channel simulator is referred to as a system capable of simulating almost all environments, which may actually occur in the wireless channels (The implementation of a multi-path fading channel simulator having a DSP-FPGA structure, Korea acoustics journal volume 23, No. 1 (01, 2004), pp. 17-23, Lee Joo-hyeon et al.).

Meanwhile, the fading mainly means the spatial variation of signal intensity, but may mean the temporal variation according to the movement of a terminal. The fading includes a slow fading or long-term fading, such as propagation loss (path loss) in a free space, or the shadow effect, in which the intensity of a reception signal is slowly changed when the terminal is moved in a wide area, and fasting fading or short-term fading, such as frequency selective fading, frequency non-selective fading or Doppler spread fading, in which the intensity of the reception signal is rapidly changed when the terminal is moved in a narrow area. In a real environment, the slow fading and the fast fading are appeared to be overlapped.

Until now, in order to realize a fading channel, an Okumura model, which is the most extensively used to estimate a signal in the downtown area, and a Hata model and a Jake model, which can be used even in a suburb and an open environment, have been employed. The slow fading is realized by simply applying only different delays for a starting signal according to various paths whereas the fast fading is realized by additionally multiplying the slow fading by a complex gain. Finally, the slow fading and the fast fading are combined and outputted to the terminal or the base station.

Conventionally, a plurality of single channel simulators for simulating a channel environment between one base station and one terminal must be used in order to simulate a real channel environment that a plurality of base stations and a plurality of terminals coexist to mutually affect each other, which significantly increases costs resulting from the duplication of the simulators in terms of functions or degrades the efficiency of space use. In order to solve the above problem, the applicant of the present invention has issued Korean patent registration No. 1286023 after filing the patent application on a large-capacity channel simulator configured to easily apply bi-directional path loss and bi-directional real-time fading with respect to all paths (P*Q) between P base stations and Q terminals.

Meanwhile, in configuring an uplink signal receiving unit of the large-capacity channel simulator for a 3GPP LTE system, it is required to support the wide transmission power range for the terminal according to the standard as follows.

Minimum terminal transmission power: −40 dBm
Maximum terminal transmission power: +23 dBm
Required signal to quantization noise ratio (SQNR)/Error vector magnitude (EVM): 30 dB
Supported request transmission power range: +23 dBm−(−40 dBm)+30 dB=93 dBm In addition, the large-capacity channel simulator is applied with a digital signal processing method to obtain the channel fading effect. To this end, the uplink signal receiving unit is provided with an ADC for receiving an analog uplink signal transmitted from the terminal to convert the uplink signal into a digital signal. A modem for such terminal or the ADC for a small-sized base station usually has resolution of 12 bits, while having a dynamic range about 60 dB(≈10*6.06 dB) when assuming that the effective bit considering the noise level is 10 bits and each bit has a dynamic range of 6.06 dB. Therefore, assuming that SQNR is 30 dB, a 12-bit ADC can handle only up to a dynamic range of maximum 30 dB (60-30).

As a result, in order to support a wide transmission power range of about 90 dBm (considering SQNR) or more for WCDMA or LTE terminals, a high-performance ADC having resolution of 16 bits to 17 bits should be provided for each terminal in the uplink signal receiving unit of the large-capacity channel simulator. Accordingly, there has been a problem that the manufacturing cost of the channel simulator increases drastically.

As related art, there is Korean patent registration No. 10-1286023 entitled "channel simulator".

SUMMARY OF THE INVENTION

In order to solve the above problem, an object of the present invention is to provide a control method for a channel simulator, capable of expanding a processable dynamic range of an uplink signal receiving unit while adopting an A/D converter (ADC) having low resolution by adjusting an attenuation amount of the uplink signal receiving unit in a large-capacity channel simulator having P base stations and Q terminal interfaces.

In order to accomplish the above object, there is provided a control method for a channel simulator that includes P base station interface cards (BS I/F cards) (P>2; P is an integer), a link processor block, and Q user equipment interface cards (UE I/F cards) (Q>2; Q is an integer) to form channels with respect to all paths between P base stations and Q terminals. The control method includes: (a) establishing a table representing an attenuation amount offset in an uplink signal receiving unit of the UE I/F card over a path loss based on log data with respect to terminal transmission power over the path loss for eliminating change of the path loss exerting an influence upon the terminal transmission power; (b) searching for a specified path loss value from the table established in step (a) to determine an attenuation amount corresponding to the specified path loss value when a path loss value with respect to an uplink signal processing process is specified; and (c) adjusting an attenuation amount in the uplink signal receiving unit of the UE I/F card based on the attenuation amount determined in step (b).

In the above configuration, an overall path loss range in the table is divided at equidistant intervals or an overall attenuation amount offset range in the table is divided at equidistant intervals.

If an attenuation amount offset corresponding to the specified path loss value is not found in the table in step (b), interpolation is performed based on attenuation amount offsets for upper and lower path loss values of the specified path loss value to determine a corresponding attenuation amount.

The control method further includes (d) restoring the path loss value, which is changed based on the attenuation amount adjusted in step (c), into an original value by adjusting an amplifier gain of the BS I/F card or a link processing block.

According to the control method for the channel simulator of the present invention, it is possible to adopt an A/D converter (ADC) having low resolution by expanding a processable dynamic range of an uplink signal receiving unit through adjusting an attenuation amount of the uplink signal receiving unit in a large-capacity channel simulator having P base stations and Q terminal interfaces. Accordingly, costs for manufacturing the large-capacity channel simulator are remarkably reduced.

DETAILED DESCRIPTION OF THE INVENTION

Hereinafter, a control method for a channel simulator according to an exemplary embodiment of the present invention will be described with reference to accompanying drawings. Before the description of the control method, the structure of a large-capacity channel simulator suggested by the applicant of the present invention will be described.

Figure 1:
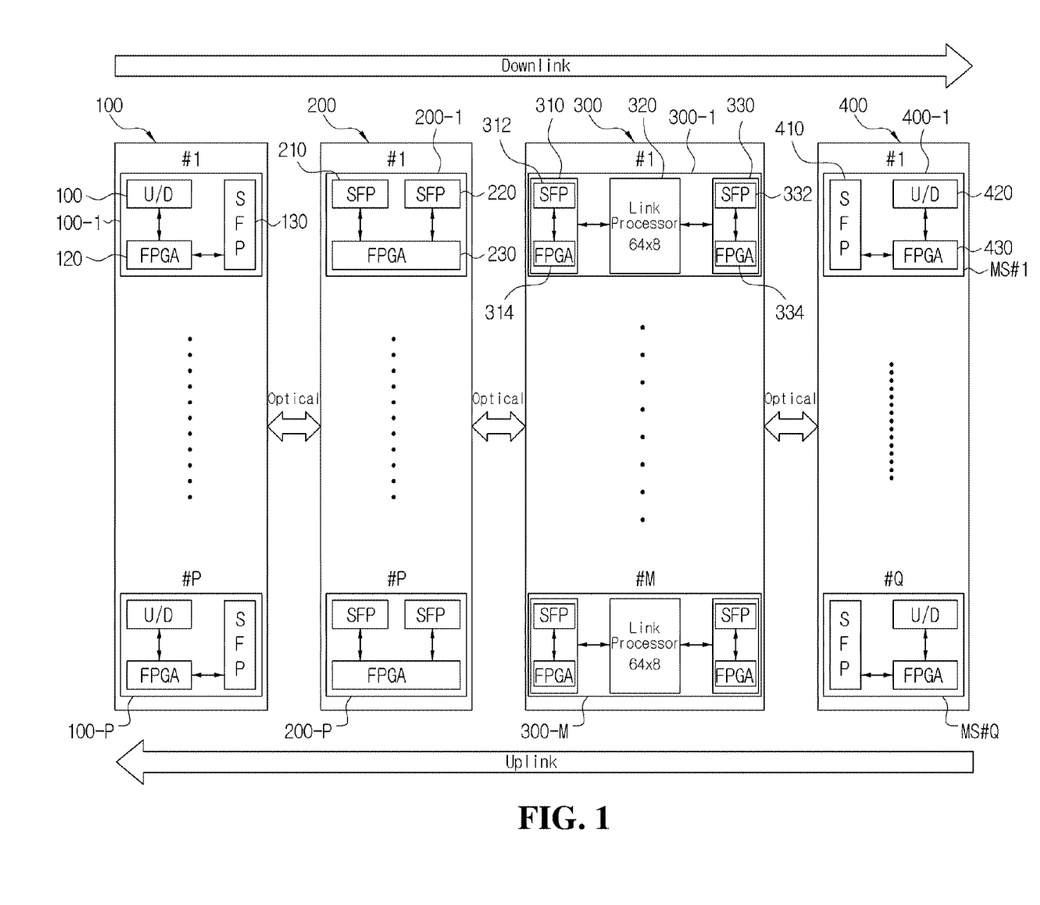
FIG. 1 is a block diagram of a large-capacity channel simulator disclosed in the related art of the applicant of the present invention.

FIG. 1 is a block diagram of a large-capacity channel simulator disclosed in the related art of the applicant of the present invention. Hereinafter, only a function of processing an uplink signal related to the present invention will be described. Moreover, photo-electric converters 130, 210, 220, 310, 330, and 410 that handle a function of converting an optical signal into an electrical signal or vice versa, and serial-parallel converters 120, 314, 334, and 430 are excluded in the description for better understanding.

As shown in FIG. 1, the large-capacity channel simulator in relation to the uplink processing function includes: a terminal interface block 400 including a plurality of terminal interface cards 400-1, . . . , and 400-Q for outputting a baseband signal obtained by down-converting an RF uplink signal that is inputted from a plurality of terminals and in one-to-one correspondence with the terminals; a link processing block 300 including a plurality of link processing groups 300-1, . . . , and 300-M each having a plurality of front input/output units 310, a plurality of link processors 320, and a plurality of rear input/output units 330, for performing fast fading and slow fading for each channel on a plurality of terminals after replicating a baseband uplink signal output from the terminal interface block 400 into a plurality of baseband uplink signals; a distribution/merge (DM) block 200 including a plurality of distribution/merge devices 200-1, . . . , and 200-P for merging all of the uplink fading signals heading each base station among all uplink fading signals for all of the Q terminals outputted from the link processing block 300, and outputting the merged uplink fading signals to base station interface cards 100-1, . . . , and 100-P of the base station interface block 100, which are in one-to-one correspondence with the distribution/merge devices 200-1, . . . , and 200-P; and a base station interface block 100 including a plurality of base station interface cards 100-1, . . . , 100-P for up-converting the uplink fading signals outputted from the distribution/merge block 200, and outputting the up-converted uplink fading signals to corresponding base stations. Reference numeral 110 in drawings denotes an up-down converter provided in each of the base station interface cards 100-1, . . . , 100-P to perform up-conversion and down-conversion, and reference numeral 420 denotes an up-down converter provided in each of the terminal interface cards 400-1, . . . , 400-P to perform up-conversion and down-conversion.

Figure 2:
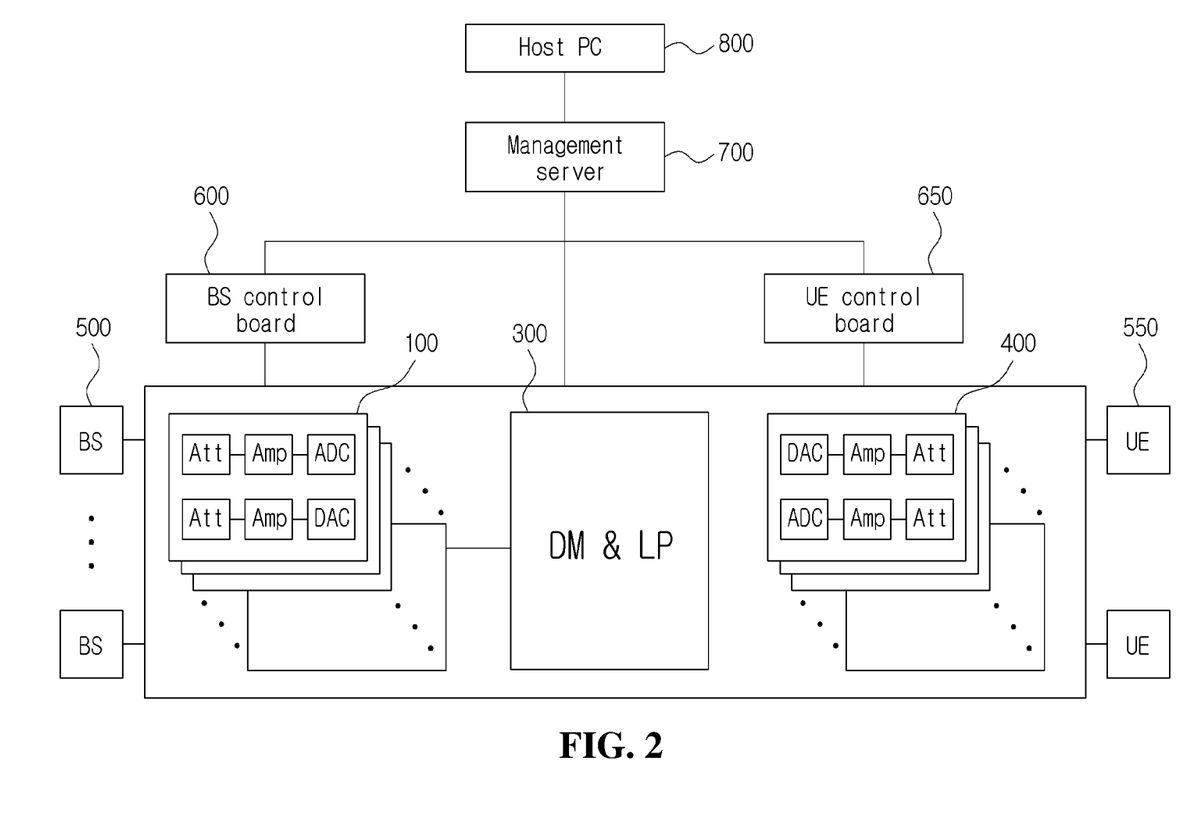
FIG. 2 is a block diagram of a large-capacity simulator system for implementing a control method for a channel simulator according to the present invention.

FIG. 2 is a block diagram of a large-capacity simulator system for implementing a control method for a channel simulator according to the present invention. As shown in FIG. 2, the channel simulator system for implementing the control method according to the present invention may include a channel simulator (massive air interface channel simulator, MAS) shown in FIG. 1. Meanwhile, although not shown in FIG. 1, the up-down converter 110 of each base station interface card (hereinafter referred to as "BS I/F card") 100-1, 100-2, . . . , 100-P includes an attenuator Att, an amplifier Amp, and an A/D converter ADC for performing the A/D conversion, which are provided for the downlink channel (down-converter) and provided to set (provide) an environment having mutually different path losses according to base stations. In addition, a D/A converter DAC, an amplifier Amp, and an attenuator Att are provided to configure an uplink channel (up-converter).

Similarly, the up-down converter 420 of each terminal interface card (hereinafter referred to as "UE I/F card") 400-1, 400-2, . . . , 400-Q includes a D/A converter DAC, an amplifier Amp, and an attenuator Att, which are provided for a downlink channel (up-converter) and provided to set (provide) an environment having mutually different path losses according to terminals. In addition, an attenuator Att, an amplifier Amp, and an A/D converter ADC for performing the A/D conversion are provided to configure an uplink channel (down-converter).

In this case, the configuration of each up-down converter 110 or 420 including the amplifier Amp and the attenuator Att is achieved through a variable configuration that at least one of the amplifier Amp and the attenuator Att is adjustable from the outside. In this case, the amplifier Amp and a variable attenuator Att having mutually different power-level adjustment resolution may be used. Of course, the configuration of each up-down converter 110 or 420 including the amplifier Amp and the attenuator Att may include a single variable amplifier or a single variable attenuator.

Referring to FIG. 2 again, the large-capacity channel simulator system applied with the control method of the present invention includes the above-described channel simulator (MAS), a plurality of base stations (BS) 500, for example, P base stations 500 connected to a plurality of BS I/F cards, which are provided in the base station interface block 100, with one-to-one correspondence, or one-to-many correspondence, a plurality of user equipment (UE, hereinafter simply referred to as "terminal") 550, for example, Q user equipment connected to a plurality of UE I/F cards of the terminal interface block 400 of the channel simulator (MAS) with one-to-one correspondence, or one-to-many correspondence, a BS control board 600 to adjust the gain of the amplifier Amp of each BS I/F card of the channel simulator (MAS) or the attenuation amount of the attenuator Att, a UE control board 650 to adjust the gain of the amplifier of each UE I/F card of the channel simulator (MAS) or the attenuation amount of the attenuator Att, a host PC 800 having a user interface (UI) program to receive a required carrier frequency from a user and receive various scenarios, such as the connection between the base station and the terminal, and fading parameters between the base station and the terminal, and a management server 700 to control, in the state that the various scenarios set in the host PC 800 are stored in the form of a data file, a base station control board 600, a terminal control board 650, and the operation of the channel simulator (MAS) according to the scenario file.

In the above-described configuration, one base station control board 600 and one terminal control board 650 may control a plurality of BS I/F cards and a plurality of UE I/F cards, for example, 12 BS I/F cards and 12 UE I/F cards. The management server 700 may store A/D conversion data (hereinafter, referred to as "ADC data") of the BS I/F card related to the PL calibration or calibration data therefor and issue a calibration instruction, that is, an instruction to adjust the gain of the amplifier Amp of the BS I/f card or the attenuation amount of the attenuator Att. The management server 700 collects a diagnostic monitoring (DM) message from each terminal and issues an instruction to adjust the gain of the amplifier Amp of the UE I/f card or the attenuation amount of the attenuator Att to the terminal control board 650 according to the DM message. The management server 700 may realize the fading channel in the unit of 1 ms in the case of a real-time system, for example, an LTE system by controlling the link processor of the channel simulator (MAS) based on the scenario file. The host PC 800, the management server 700, the base station control board 600, and the terminal control board 650 may be connected with each other over Ethernet.

Figure 3:
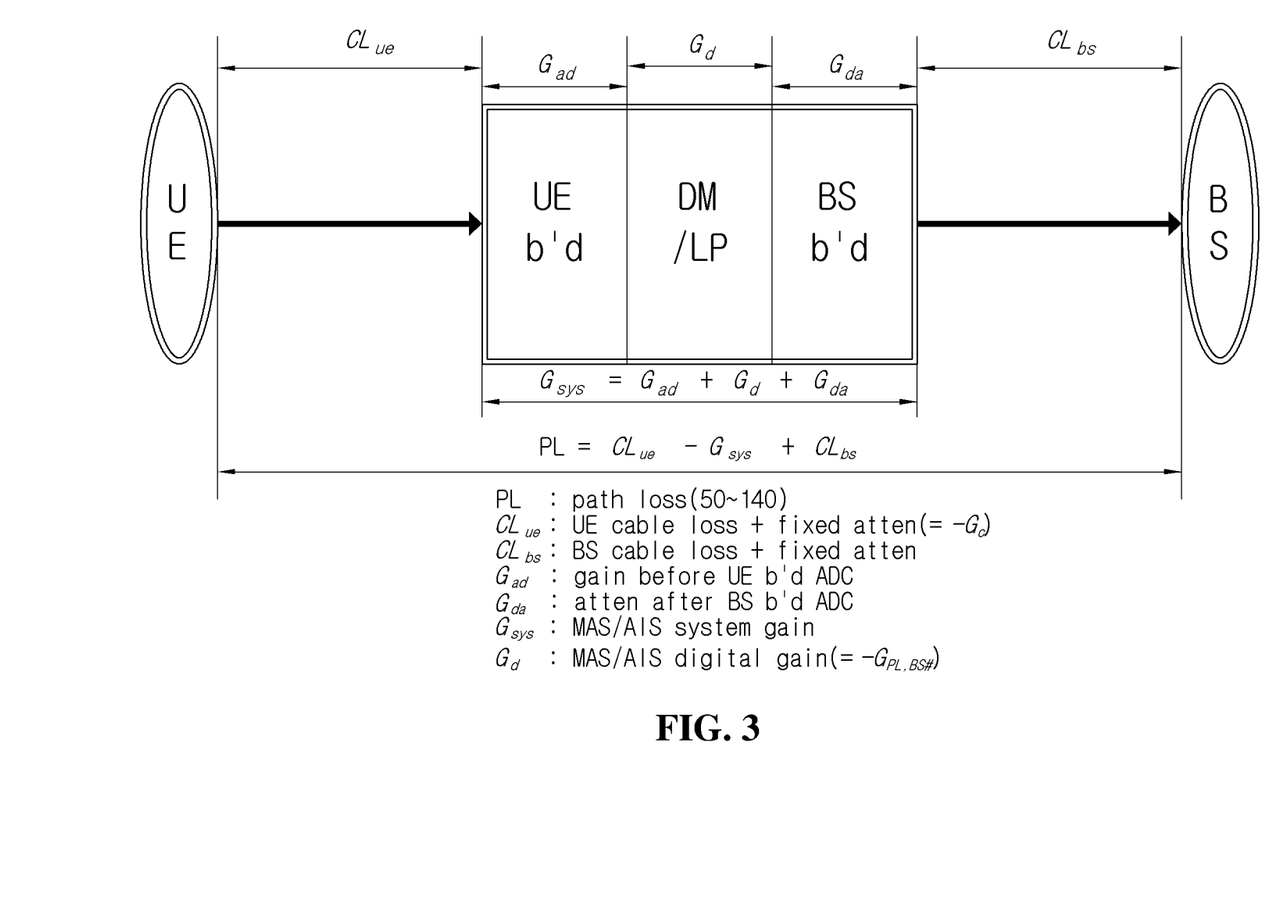
FIG. 3 is a conceptual diagram for explaining a path loss during an uplink signal processing process in the large-capacity channel simulator according to the present invention.

FIG. 3 is a conceptual diagram for explaining a path loss during an uplink signal processing process in the large-capacity channel simulator according to the present invention. As shown in FIG. 3, in the large-capacity channel simulator, a path loss in the uplink signal processing process, i.e., the total path loss PL from the terminal UE to the base station BS includes a path loss ($CL_{ue}$) in a cable connecting the UE I/F card UE b'd of the channel simulator in the terminal, a path loss ($G_{sys}$; expressed as gain) inside the channel simulator, and a path loss ($CL_{bs}$) in a cable connecting the base station BS in the channel simulator as shown in Equation 1 below.

$$PL = CL_{ue} - G_{sys} CL_{bs} \qquad \text{Equation 1}$$

Meanwhile, the path loss $G_{sys}$ inside the channel simulator is again calculated by adding the gain Gad of the UE I/F card UE b'd, the gain $G_{da}$ of the BS I/F card BS b'd, and the gain $G_d$ of the link processing block DM/LP. With this structure, the attenuation amount of the attenuator Att of the UE I/F card UE b'd or the BS I/F card BS b'd in the channel simulator, or the amplifier gain $G_d$ of the link processing block DM/LP is appropriately adjusted, so that the path loss from the terminal to the base station may be controlled into a desired value.

Figure 4:
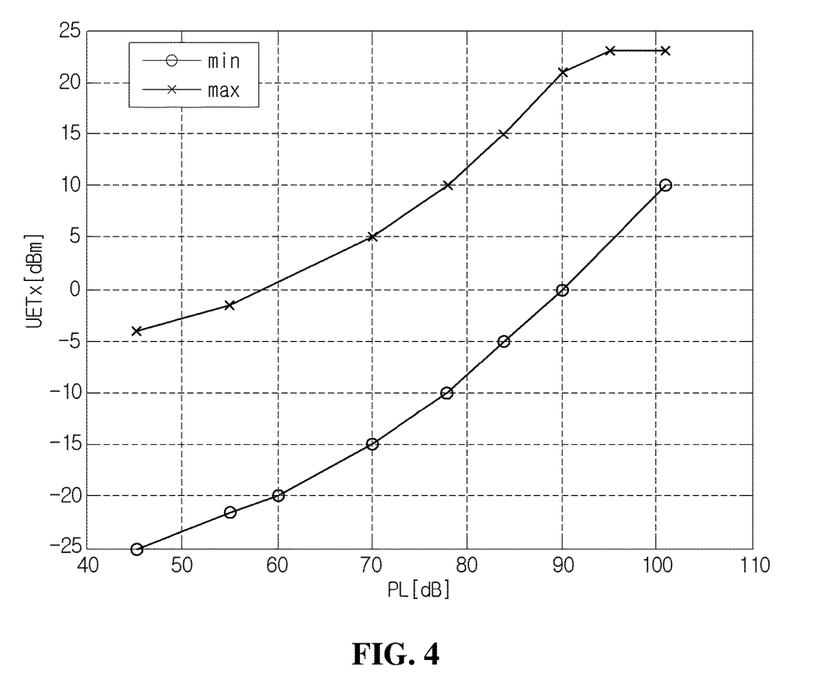
FIG. 4 is a graph showing a result of simulating a relationship between the path loss and terminal transmission power during the uplink signal processing process using the channel simulator according to the present invention.

FIG. 4 is a graph showing a result of simulating a relationship between the path loss and terminal transmission power during the uplink signal processing process using the channel simulator according to the present invention. As shown in FIG. 4, according to the simulation result of the relationship between the path loss PL and the terminal transmission power UE Tx power in the uplink signal processing process using the channel simulator, the transmission power of the terminal increases as the path loss increases, so that the range of the terminal transmission power is constantly limited to about 20 dBm at a specific path loss, that is, an arbitrary path loss value, even if the range of the terminal transmission power according to the total path loss is large by about 50 dBm. In this case, 20 dBm is a value including the number of resource blocks (RBs) and the power change due to the fading margin. It can be seen that uplink signals can be received with a dynamic range up to about 50 dBm for any specific path loss even if SQNR=30 dB, which is further required, is considered, which means that it is sufficient to adopt the ADC having 12-bit resolution in the UE I/F card, i.e., the uplink signal receiving unit.

In other words, in the control method for the channel simulator according to the present invention, the attenuation amount of the attenuator in the uplink signal receiving unit is adjusted according to the amount of path loss for the uplink signal from the terminal to the base station in the channel simulator, so that the dynamic range of the uplink signal inputted to the uplink signal receiving unit can be lowered to a level that can be handled by the ADC having 12-bit resolution.

According to the simulation result shown in FIG. 4, a partially linear relationship is established between the path loss and the terminal transmission power. For example, a terminal transmission power of maximum −4 dBm at a path loss of 45 dB assumes a maximum resource block (RB) of 100 RB.

Figure 5:
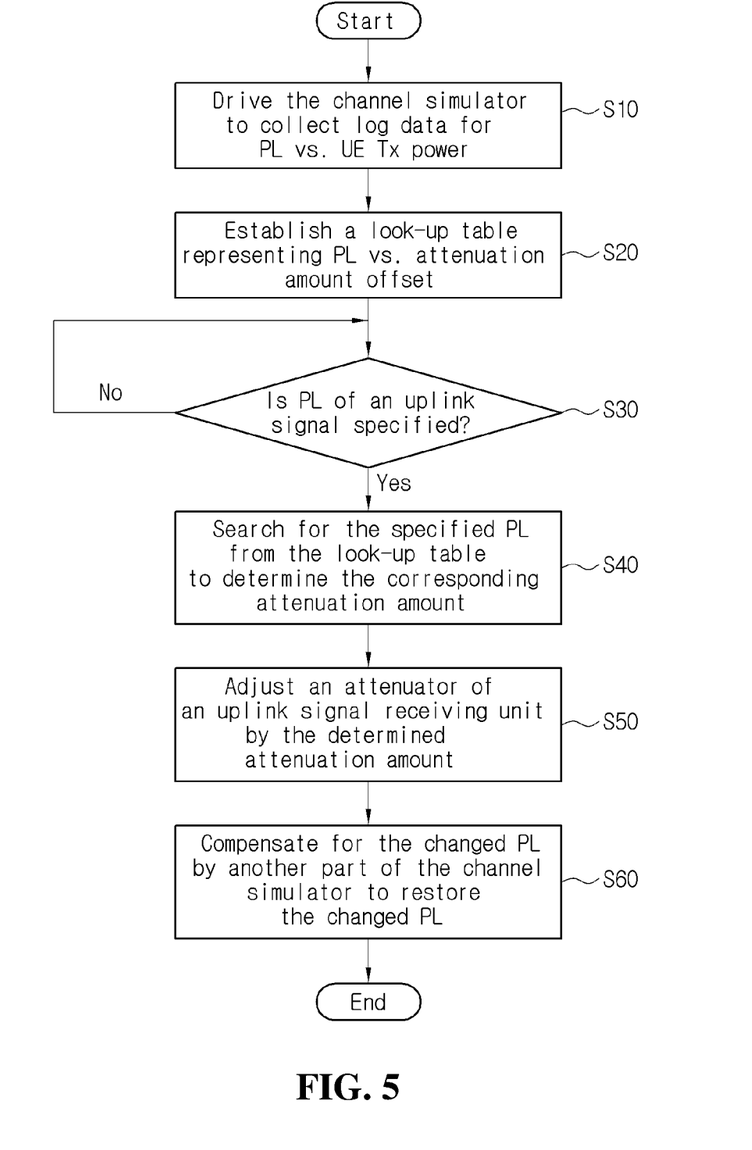
FIG. 5 is a flowchart for explaining the control method for the channel simulator according to the present invention.

FIG. 5 is a flowchart for explaining the control method for the channel simulator according to the present invention. As described above, the control method can be performed by the management server, or by cooperation of the management server with the UE I/F card and the BS I/F card. As shown in FIG. 5, according to the control method for the channel simulator according to the present invention, the channel simulator is driven to collect log data with respect to the terminal transmission power (UE Tx power) over the path loss PL in step S10. Next, a table representing an attenuation amount offset over the path loss is established based on the collected log data in step S20.

In detail, the relational expression (see FIG. 4) between the path loss and the terminal transmission power according to the log data collected in step S10 is quantized into a plurality of relational expressions, and the table (look-up table) representing the attenuation amount offset over the path loss is established based on this. Table 1 below is a table representing an attenuation amount offset over a path loss, which is established by taking FIG. 4 as an example.

TABLE 1

| Path loss (dB) | Attenuation amount offset (dBm) |
|---|---|
| 45 | 0 |
| 50 | 2 |
| 55 | 3.5 |
| 60 | 5 |
| 65 | 7.5 |
| 70 | 10 |
| 75 | 13 |
| 80 | 17 |
| 85 | 21 |
| 90 | 25 |
| 95 | 30 |
| 100 | 34 |

In the graph shown in FIG. 4, the maximum dynamic range of the terminal transmission power is 35 dBm (=25−(−10)) when a path loss of 45 to 100 dB is uniformly quantized, which is quantized at path loss (PL) intervals of 5 dB to establish the look-up table as shown above in Table 1. In addition, according to the graph shown FIG. 4, no log data for PL=50 dB is found, and only log data for PL=45 dB and PL=56 dB is found. In this case, terminal transmission power at PL=50 dB can be estimated by interpolation after assuming that a terminal transmission power value between PL=45 dB and PL=56 dB is partially linear.

Unlike Table 1, Table 2 below is a look-up table showing the results of quantization for the attenuation amount offsets at uniform intervals, for example, intervals of 5 dBm, and it is also possible to establish a look-up table as shown in Table 2.

TABLE 2

| Path loss (PL) (dB) | Attenuation amount offset (dBm) |
|---|---|
| 45 | 0 |
| 60 | 5 |
| 70 | 10 |
| 77.5 | 15 |
| 83.5 | 20 |

TABLE 2-continued

| Path loss (PL) (dB) | Attenuation amount offset (dBm) |
|---|---|
| 90 | 25 |
| 96 | 30 |
| 101.5 | 35 |

In a state that the lookup table is established as described above, it is determined in step S30 whether the path loss PL in the uplink signal processing process is specified by the user. If the path loss is specified, the process proceeds to step S40 to search for the specified path loss value from the look-up table to determine the corresponding attenuation amount. The specified path loss value may not be found in the look-up table during the process, and in this case, the corresponding attenuation amount is determined by performing the interpolation based on the upper and lower path loss values of the specified path loss value.

Next, the attenuation amount of the attenuator included in the uplink signal receiving unit, i.e., the UE I/F card is adjusted in step S50 by the attenuation amount thus determined. When the process is performed, the power dynamic range of and input signal in the uplink signal receiving unit is reduced to a level that can be sufficiently processed by the ADC having 12-bit resolution.

Figure 6:
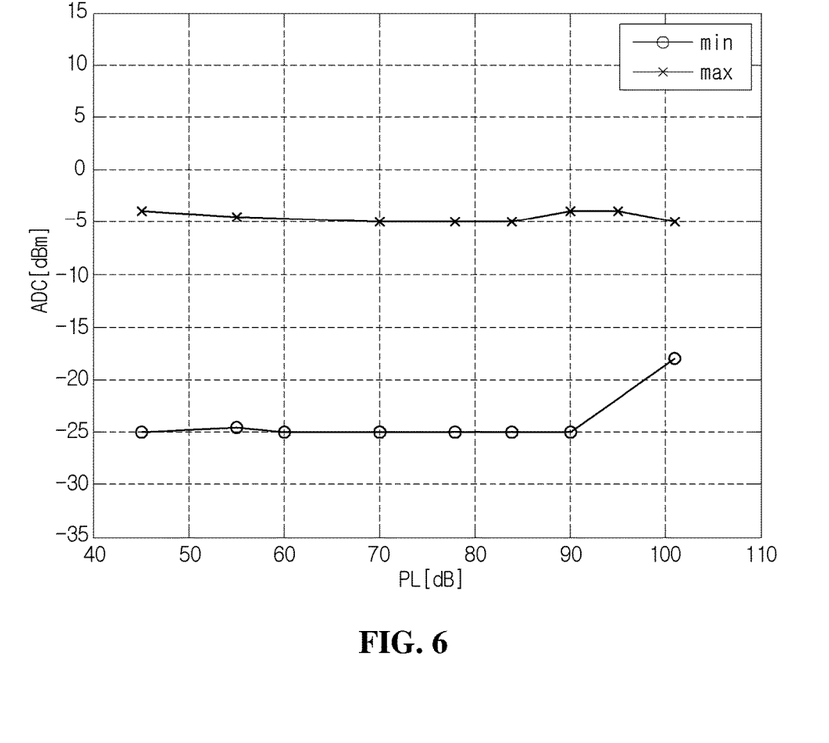
FIG. 6 is a graph showing a power value inputted to an ADC of an uplink signal receiving unit while an input dynamic range is adjusted according to the control method for the channel simulator according to the present invention.

FIG. 6 is a graph showing a power value inputted to an ADC of an uplink signal receiving unit while an input dynamic range is adjusted according to the control method for the channel simulator according to the present invention. As shown in FIG. 6, according to the control method for the channel simulator according to the present invention, the attenuation amount of the attenuator in the uplink signal receiving unit is adjusted in advance based on the path loss value, so that the dynamic range of ADC input power in the uplink signal receiving unit is reduced to approximately 25 dBm or less regardless of the path loss value.

Referring to FIG. 5 again, the path loss value, which is different from the original required value due to the adjustment on the attenuation amount of the attenuator in the uplink signal receiving unit, is restored as original by adjusting the amplifier gain of another part of the channel simulator, that is, the link processor block, the attenuation amount of the attenuator in the BS I/F card of the base station interface block, or the gain of the amplifier in step S60.

As described above, although the control method for the channel simulator according to the exemplary embodiment of the present invention has been described for the illustrative purpose, various modifications and changes are possible within the technical scope of the present invention. Accordingly, the scope of the present invention should be defined by accompanying claims. For example, the quantization interval, that is, the path loss value (in case of Table 1) or the attenuation amount offset (in the case of Table 2) may be differently adjusted according to the density of the path loss value over section of log data, when the look-up table is established based on the log data with respect to the terminal transmission power over the path loss.

What is claimed is:

1. A control method for a channel simulator that includes P base station interface cards (BS I/F cards), wherein P is an integer greater than 2, a link processor block, and Q user equipment interface cards (UE I/F cards), wherein Q is an integer greater than 2 to form channels with respect to all paths between P base stations and Q terminals, the control method comprising:

(a) establishing a table representing an attenuation amount offset in an uplink signal receiving unit of the UE I/F card over a path loss based on log data with respect to terminal transmission power over the path loss for eliminating change of the path loss exerting an influence upon the terminal transmission power;

(b) searching for a specified path loss value from the table established in step (a) to determine an attenuation amount corresponding to the specified path loss value when a path loss value with respect to an uplink signal processing process is specified;

(c) adjusting an attenuation amount in the uplink signal receiving unit of the UE I/F card based on the attenuation amount determined in step (b); and (d) restoring the path loss value, which is changed based on the attenuation amount adjusted in step (c), into an original value by adjusting an amplifier gain of the BS I/F card or a link processing block.

2. The control method of claim 1, wherein an overall path loss range in the table is divided at equidistant intervals.

3. The control method of claim 1, wherein an overall attenuation amount offset range in the table is divided at equidistant intervals.

4. A control method for a channel simulator that includes P base station interface cards (BS I/F cards), wherein P is an integer greater than 2, a link processor block, and Q user equipment interface cards (UE I/F cards), wherein Q is an integer greater than 2 to form channels with respect to all paths between P base stations and Q terminals, the control method comprising:

(a) establishing a table representing an attenuation amount offset in an uplink signal receiving unit of the UE I/F card over a path loss based on log data with respect to terminal transmission power over the path loss for eliminating change of the path loss exerting an influence upon the terminal transmission power;

(b) searching for a specified path loss value from the table established in step (a) to determine an attenuation amount corresponding to the specified path loss value when a path loss value with respect to an uplink signal processing process is specified; and (c) adjusting an attenuation amount in the uplink signal receiving unit of the UE I/F card based on the attenuation amount determined in step (b), wherein if an attenuation amount offset corresponding to the specified path loss value is not found in the table in step (b), interpolation is performed based on attenuation amount offsets for upper and lower path loss values of the specified path loss value to determine a corresponding attenuation amount.

* * * * *